Dec. 18, 1962 P. L. V. MONOT 3,069,324
HYDROGENATED TALLOW-PERHYDROSQUALENE
DERMATOLOGICAL EXCIPIENT
Filed May 26, 1960 2 Sheets-Sheet 1
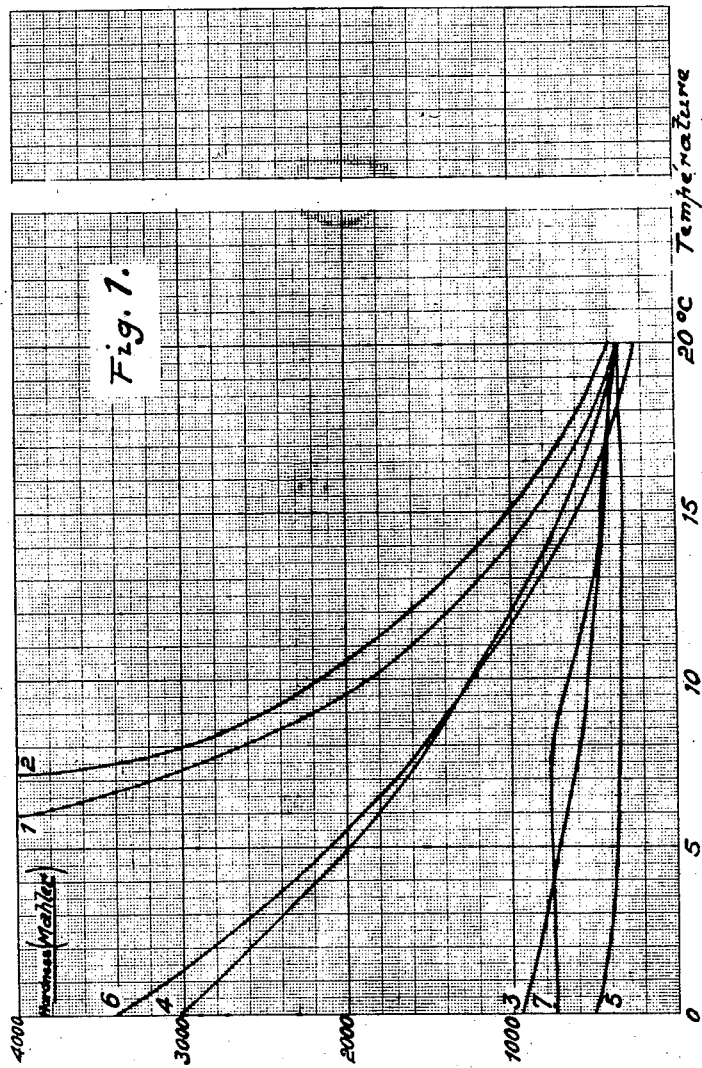

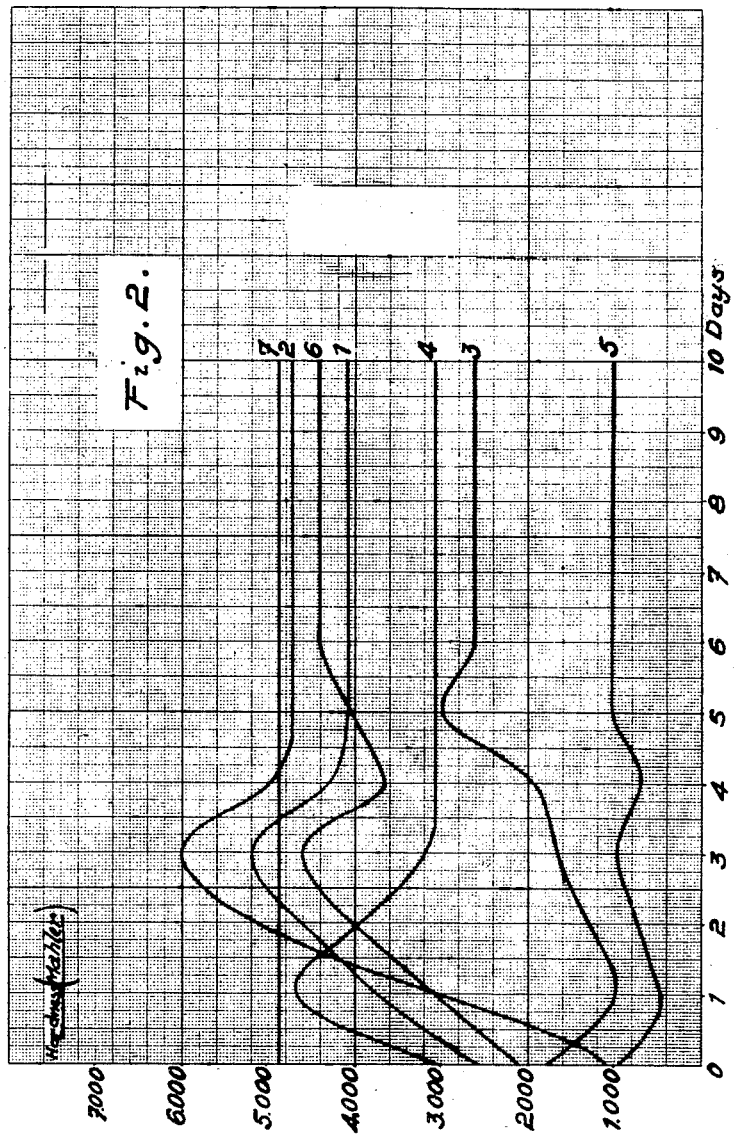

United States Patent Office 3,069,324
Patented Dec. 18, 1962

3,069,324
HYDROGENATED TALLOW-PERHYDROSQUAL-ENE DERMATOLOGICAL EXCIPIENT
Pierre Louis Victor Monot, 4 Rue de Monastir,
Dijon, Cote d'Or, France
Filed May 26, 1960, Ser. No. 31,862
Claims priority, application France June 19, 1959
3 Claims. (Cl. 167—90)

The present invention relates to a new excipient for creams and pomades based on hydrogenated tallow. It is known that excipients for creams and pomades usable is cosmetology (ointment, beauty creams and pomades etc.) must be of a soft consistency close to that of petrolatum, to be usable.

It is possible to prepare such excipients by mixing, in suitable proportions, a solid compound and a liquid compound at ambient temperature. The excipients are prepared by melting the liquid-solid mixture, this step being followed by cooling and, if desired, by milling the cooled mixture. The excipient thus comprises two phases: the crystallised solid, maintaining a saturated solution of the solid in the liquid by imbibition between the crystals.

If the respective proportions of the liquid and the solid have been suitably selected, such an excipient has a pasty consistency.

However, for the preparation of creams and pomades, in particular for cosmetological uses, it is most important that:

(1) the excipient be prepared from raw materials of animal or vegetable but not mineral origin, the latter being less suitable for human skin;

(2) the excipient should not become rancid; it must therefore be able to be stored without undergoing any alteration; turning rancid is one example of such an alteration; oozing can also be mentioned in this respect (the liquid phase transudes).

In order to obtain the best results, it is advisable to use, as a solid phase not apt to become rancid, completely hydrogenated animal or vegetable oils or fats and, as a liquid phase, a diluent or a solvent, which is also not apt to become rancid and must also be of animal or vegetable origin. This liquid must be free of unsaturations. As an example of such a liquid, perhydrosqualene can be mentioned, which is a saturated hydrocarbon extracted from hydrogenated shark oil.

Hydrogenated fats and perhydrosqualene have already been used, independently of each other, for the preparation of excipients destined for the production of creams and pomades. The present invention only contemplates mixtures containing at least one hydrogenated animal or vegetable oil or fat and perhydrosqualene.

Mixtures of perhydrosqualene and hydrogenated oils or fats containing from 25% to 50% of the latter and prepared by melting, cooling and subsequent milling have a suitable consistency for use as excipients for creams and pomades.

According to the hydrogenated oil or fat employed, these mixtures can have the following drawbacks:

(1) their hardness increases substantially upon cooling, thus making their use impossible at temperatures lower than 10 or 12° C.;

(2) during storage at a temperature lower than the melting point of the mixture (which is generally of the order of about 35° C., for example), a fraction of the solid phase dissolves in the liquid. Upon being cooled to 20° C., this dissolved fraction crystallises into large crystals and the excipient hardens considerably.

The present invention overcomes these drawbacks and provides an improved excipient having the following specific and unexpected properties: the hardness is only increased on cooling and stays sufficiently low even at 0° C. and after storage at 35° C.

The excipient in accordance with the invention is essentially characterised by the fact that it is comprised of a mixture of hydrogenated tallow and a saturated solvent or diluent of animal or vegetable origin.

According to one feature of the invention, the solvent or diluent is perhydrosqualene.

According to a further feature, the hydrogenated tallow and the solvent are mixed by any conventional method until the desired consistency is obtained.

According to a fourth feature of the invention, the excipient can contain hydrogenated tallow in amounts of from 15 to 40%.

In order to give a better illustration of the advantages obtained with the excipient according to the invention, a certain number of excipients based on other hydrogenated oil or fats will be given hereunder. The results obtained with these excipients will be compared with those obtained by the excipients according to the invention. The results of these examples are mainly concerned with consistency, which has been determined and measured by means of a Mahler penetrometer for temperatures ranging from 0° to 20° C. (cone penetrometer: E. Mahler, "Structure des Emulsions (Emulsion Structure)," Maloine-Paris, page 23–33; E. Mahler, "Mesure de la dureté des corps pâteux (Measure of the hardness of pasty bodies)" in "Parfumerie Moderne," 1953, pages 33,80, 83).

This penetrometer comprises a smooth surfaced cone having an apex angle of 90° and weighing P grams. This cone can move vertically, guided by a metal rod sliding without friction through two apertures.

A container is filled to the brim with the excipient to be measured. The excipient's surface is carefully smoothed. The cone of the penetrometer is gently lowered until the point of the cone touches the surface of the excipient. The system is left alone for 5 minutes. Under the action of gravity, the cone penetrates to a certain depth and then comes to rest. The diameter ($x$ cm.) of the cone section at the surface of the excipient is measured by means of calipers.

The hardness of the excipient is given by the formula:

$$D = \frac{P - 0.131 x^3}{0.111 x^2}$$

D being the Mahler hardness in C.G.S. units.

Measured in this way, the hardness of creams varies between 20 (very soft cream) and about 1,500 (very hard cream). At a hardness of greater than 2,000 the excipient is unusable, as it cannot pass through the orifice (diameter 5.5 mm.) of the flexible tubes used for storing creams and pomades.

PREPARATION OF THE EXCIPIENTS

Mixtures of animal or vegetable oils or fats with perhydrosqualene were prepared as follows:

The mixture of perhydrosqualene and hydrogenated fatty substance is heated until complete melting of the solid, then left to cool for 24 hours. The product obtained, of hard consistency, is milled by means of a three-roller mill so as to obtain an excipient of pasty consistency.

TESTED EXCIPIENTS

Mixtures of perhydrosqualene and hydrogenated fatty substance have been made in such proportions that the excipient obtained has a hardness of from 250 to 400 at 20° C.

The figures given in the following examples refer to parts percent by weight.

Excipient 1

Hydrogenated coco-nut oil (M.P. 45° C.) _____ 45
Perhydrosqualene, q.s. _____ 100

Excipient 2

| | |
|---|---|
| Hydrogenated cabbage-palm oil (M.P. 45° C.) | 45 |
| Perhydrosqualene, q.s. | 100 |

Excipient 3

| | |
|---|---|
| Hydrogenated whale oil (M.P. 55° C.) | 35 |
| Perhydrosqualene, q.s. | 100 |

Excipient 4

| | |
|---|---|
| Hydrogenated palm oil (M.P. 58° C.) | 45 |
| Perhydrosqualene, q.s. | 100 |

Excipient 5

| | |
|---|---|
| Hydrogenated tallow (M.P. 58° C.) | 30 |
| Perhydrosqualene, q.s. | 100 |

Excipient 6

| | |
|---|---|
| Hydrogenated peanut oil (M.P. 68° C.) | 40 |
| Perhydrosqualene, q.s. | 100 |

Excipient 7

| | |
|---|---|
| Castor oil (M.P. 85° C.) | 35 |
| Perhydrosqualene, q.s. | 100 |

(To prepare this latter excipient, the mixture should be stirred during the entire cooling.)

The hardness of these excipients was measured by means of the Mahler penetrometer for temperatures comprised between 0° and 20° C. The results of these measurements are given in FIGURE 1 of the drawings, the numerals identifying each line of the graph referring to the excipient number in the examples above.

The excipients were then stored for 48 hours at 35° C., then left at laboratory ambient temperature for 6 hours. Their hardnesses were measured at 19° C. These excipients were kept at the laboratory temperature and their hardnesses were measured every day at 19° C., for 10 days. FIGURE 2 of the drawings illustrates the results obtained using the compositions in accordance with the seven examples above.

RESULTS (1) Only the excipients 3, 5 and 7 have a hardness of less than 2,000 at 0° C., and are accordingly usable in flexible tubes at this temperature.

(2) After storage at 35° C., only excipient 5 retains sufficient plasticity to be usable.

The only hydrogenated fatty substance capable of giving, when mixed with perhydrosqualene, an excipient suitable for creams and pomades is accordingly hydrogenated tallow.

CONSERVATION

After storage for one year, excipient 5 has the following characteristics:

| | |
|---|---|
| Mahler hardness | 350 |
| Peroxide number (International unified methods) | 18 |
| Perhydrosqualene exuded | nil |

This data means that the excipient forming the subject-matter of this invention has a constant hardness, does not become rancid and remains homogeneous for at least one year.

USE

It is possible to prepare various formulations of excipients from perhydrosqualene-hydrogenated tallow mixtures:

Example 8.—Fatty Excipient

| | |
|---|---|
| Hydrogenated tallow | 30 |
| Perhydrosqualene, q.s. | 100 |

Example 9.—Water-Washable Penetrating Excipient

| | |
|---|---|
| Polyethylene glycol stearate (300) | 14 |
| Hydrogenated tallow | 24 |
| Perhydrosqualene, q.s. | 100 |

Example 10.—Emulsified Excipient in Continuous Aqueous Phase

| | |
|---|---|
| Hydrogenated tallow | 10 |
| Perhydrosqualene | 20 |
| Polyethoxylated sorbitan stearate | 2 |
| Sorbitan stearate | 4 |
| Glycerine | 10 |
| Water, q.s. | 100 |

Example 11.—Emulsified Excipient in Continuous Oil Phase

| | |
|---|---|
| Hydrogenated tallow | 14 |
| Perhydrosqualene | 37 |
| Polyethylene glycol distearate (300) | 8 |
| Lanolin | 5 |
| Water, q.s. | 100 |

Examples 9 to 11 show that it is possible to add other currently used substances, such as emulsifiers, etc., to a simple excipient of the type given in Example 8, in order to facilitate skin penetration, water-washability, etc.

All these excipients can be used for the preparation of creams or pomades for cosmetological or dermatological uses.

I claim:

1. An excipient for dermatological use comprising a mixture of 15–40% by weight hydrogenated tallow and 85–60% by weight perhydrosqualene.

2. An excipient for dermatological use comprising a mixture of 30% by weight hydrogenated tallow and 70% by weight perhydrosqualene.

3. An excipient for dermatological use comprising a mixture of 14% by weight polyethylene glycol stearate, 24% by weight hydrogenated tallow and 62% by weight perhydrosqualene.

References Cited in the file of this patent

Sabetay: Soap, Perfumery & Cosmetics, 28: 10 (1955), pp. 1125–1127.

Manufacturing Chemist, 27: 1, January 1956, p. 21.

Fiero: J.A.P.A., 20: 3, March 1931, pp. 254–259.

Fiero: 6 pp. reprint from J.A.P.A., Sci. Ed., 29: 1, January 1940.